United States Patent
Perez

(10) Patent No.: US 6,974,616 B2
(45) Date of Patent: Dec. 13, 2005

(54) THERMOGLUE BINDING TAPE TO PROTECT AND DECORATE CARPET'S EDGES AND BORDERS WITH A FUSE SYSTEM

(76) Inventor: Benigno G. Perez, 2754 Mickle Ave., Bronx, NY (US) 10469

( * ) Notice: Subject to any disclaimer, the term of this patent is extended or adjusted under 35 U.S.C. 154(b) by 30 days.

(21) Appl. No.: 10/790,555

(22) Filed: Mar. 1, 2004

(65) Prior Publication Data

US 2004/0166285 A1 Aug. 26, 2004

Related U.S. Application Data

(63) Continuation of application No. 10/646,947, filed on Aug. 22, 2003.

(30) Foreign Application Priority Data

Aug. 27, 2002 (PE) .................................. 000823-2002/OIN

(51) Int. Cl.[7] .................................................. B32B 3/02
(52) U.S. Cl. .................... 428/40.1; 428/41.8; 428/41.9; 428/121; 428/192; 428/193; 428/194; 428/354
(58) Field of Search .............................. 428/40.1, 41.8, 428/121, 192, 193, 194, 41.9, 354

(56) References Cited

U.S. PATENT DOCUMENTS

| | | | |
|---|---|---|---|
| 1,423,143 A | 7/1922 | Patterson | |
| 2,553,765 A | * 5/1951 | Higgins et al. | 156/295 |
| 4,054,698 A | 10/1977 | Hamrah | |
| 4,483,896 A | 11/1984 | Gray et al. | |
| 5,018,235 A | 5/1991 | Stamatiou et al. | |
| 5,045,374 A | 9/1991 | Tucker | |
| D394,776 S | 6/1998 | Callas | |
| 5,766,726 A | 6/1998 | Bannister | |
| 6,517,922 B2 | 2/2003 | Ang et al. | |

* cited by examiner

Primary Examiner—Nasser Ahmad
(74) Attorney, Agent, or Firm—Richard L. Miller

(57) ABSTRACT

A thermoglue binding tape to protect and decorate carpet's edges and borders with a fuse system. An adhesive is disposed at strategic locations on a tape. In one embodiment, the adhesive completely covers one surface of the tape and the tape is bent into a channel shape that adhesively captures the unfinished edge of the carpet. In another embodiment, one strip of adhesive extends along one surface of the tape adjacent one edge thereof, another strip of adhesive extends along the other surface of the tape adjacent the other edge thereof, and the tape is bent into a channel shape that adhesively captures the unfinished edge of the carpet, with a terminating portion of the tape bent under itself. In still another embodiment, one strip of adhesive completely covers one surface of the tape and another strip of adhesive extends along the other surface thereof adjacent one edge thereof. Welting is adhered along the one surface of the tape, which wraps therearound and is adhered thereto with a flange extending free therefrom that underlying adheres to the unfinished edge of the carpet.

4 Claims, 2 Drawing Sheets

THERMOGLUE BINDING TAPE TO PROTECT AND DECORATE CARPET'S EDGES AND BORDERS WITH A FUSE SYSTEM

CROSS REFERENCE TO RELATED APPLICATIONS

The instant application is a continuation of U.S. application Ser. No. 10/646,947, filed on Aug. 22, 2003, and entitled PROTECTIVE CARPET BINDING, which claimed the priority of Republic of Peru application document number 000823-2002/OIN 000001, filed Aug. 27, 2002.

BACKGROUND OF THE INVENTION

1. Field of the Invention

The present invention relates to a binding. More particularly, the present invention relates to a thermoglue binding tape to protect and decorate carpet's edges and borders with a fuse system.

2. Description of the Prior Art

Numerous innovations for finishing strips have been provided in the prior art that will be described. Even though these innovations may be suitable for the specific individual purposes to which they address, however, they differ from the present invention.

A FIRST EXAMPLE, U.S. Pat. No. 1,423,143 to Patterson teaches a strip for holding the edges of floor covering, a strip having a thin flap on the top of one edge, and a downwardly and inwardly inclined face on the other edge.

A SECOND EXAMPLE, U.S. Pat. No. 4,054,698 to Hamrah teaches carpet binding tape for providing the edge portion of floor covering with a uniform edge and including a body of adhesive material for adhesively securing the edge molding to the edge portion of the floor covering. The carpet binding tape prevents unraveling and fraying of the carpet and may be of flexible material thereby permitting the carpet to be rolled up without removal of the carpet binding tape.

A THIRD EXAMPLE, U.S. Pat. No. 4,483,896 to Gray et al. teaches a carpet seaming apparatus that includes an elongated bonding tape having an electrical resistance circuit with contacts at the edge of the tape mounted on the face thereof with a hot melt adhesive in the form of elongated beads running the length of the tape that melts in response to electrical current in the resistive conductors. A tool having spaced apart electrical contacts for engaging the contacts adjacent the edges of the tape inducing an electrical current therein for heating and melting the hot melt adhesive.

A FOURTH EXAMPLE, U.S. Pat. No. 5,018,235 to Stamatiou et al. teaches a holder for flexible material, for example a disposable floor mat, that comprises a base on which the material rests, at least part of the base having an integral wall so arranged as to form a recess. The recess is dimensioned so as to receive the material in a close fit and means are provided to hold the material in place. The holding means may comprise a lip integral with the wall of the holder which extends above the recess and means may be provided on the surface of the holder to act as a guide for the correct placement of the material. Additionally or alternatively the base of the holder may include holding means such as "Klettostop", which comprises a plurality of upwardly extending hooks or spikes formed from a plastic material. Means may also be provided for retaining the holder on a support surface.

A FIFTH EXAMPLE, U.S. Pat. No. 5,045,374 to Tucker teaches a stiff plastic strip that is formed to provide reinforcement for longitudinal edges at which interior drywall surfaces meet and for capping corners formed of sheets of wallboard meeting at orthogonal angles. A pair of laterally directed flanges extend in diverging fashion from a central transversely curved region of the plastic strip. A contact sensitive adhesive strip is mounted on each of the flanges to extend longitudinally therealong so as to allow the plastic strip to be pressed against drywall or wallboard surfaces. One of the flanges of the plastic strip may be slit periodically throughout its length to allow it conform to arches and circular openings. In another embodiment a stiff, water impervious plastic sheet with three flanges extending outwardly therefrom has contact sensitive adhesive layers disposed on each of the flanges. The structure can thereby serve as a cap for protruding soffit corners.

A SIXTH EXAMPLE, U.S. Pat. No. Des. 394,776 to Callas teaches the ornamental design for a floor mater border.

A SEVENTH EXAMPLE, U.S. Pat. No. 5,766,726 to Bannister teaches a resilient, semi-rigid molding strip for installation along an edge of an linoleum floor surface, particularly suited to installations where the edge follows a curved contour. The molding strip is formed from extruded semi-rigid vinyl. There is a horizontal top flange and a vertical web having an angled nailing surface along its lower edge. The nailing surface correctly aligns the fasteners, and the web section is drawn downwardly during installation so that the top flange is resiliently biased against the linoleum surface. The characteristics of the semi-rigid material permit the strip to be bent in the horizontal plane without buckling the top flange or footing section of the web.

AN EIGHTH EXAMPLE, U.S. Pat. No. 6,517,922 B2 to Ang, et al. teaches a kit for use in finishing a cut edge of floor coverings such as mats, carpets, carpet runners, and roll runners having a cut side edge including an elongated edging strip which has a length equal to or exceeding the length of the cut edge to be finished. The lateral width of the edging strip is selected so that when secured in place, the strip substantially covers and conceals the cut edge. The edging strip includes a flexible ribbon and an attachment member provided to permanently secure the ribbon in position substantially overlapping the cut edge. Preferably, the attachment member comprises a piece of two-sided tape having a length and width generally corresponding to that of the finishing strip. The two-sided tape is secured along a first side to the finishing strip, and a release sheet is carried by and releasably secured to the second other side of the tape. In use, the release sheet is removed to activate the adhesive tape, whereupon the second side of the tape is pressed into contact with the floor covering to secure the finishing strip or ribbon in place.

It is apparent that numerous innovations for finishing strips have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a thermoglue binding tape to protect and decorate carpet's edges and borders with a fuse system that avoids the disadvantages of the prior art.

ANOTHER OBJECT of the present invention is to provide a thermoglue binding tape to protect and decorate carpet's edges and borders with a fuse system that is simple to use.

BRIEFLY STATED, STILL ANOTHER OBJECT of the present invention is to provide a thermoglue binding tape to protect and decorate carpet's edges and borders with a fuse system. An adhesive is disposed at strategic locations on a tape. In one embodiment, the adhesive completely covers one surface of the tape and the tape is bent into a channel shape that adhesively captures the unfinished edge of the carpet. In another embodiment, one strip of adhesive extends along one surface of the tape adjacent one edge thereof, another strip of adhesive extends along the other surface of the tape adjacent the other edge thereof, and the tape is bent into a channel shape that adhesively captures the unfinished edge of the carpet, with a terminating portion of the tape bent under itself. In still another embodiment, one strip of adhesive completely covers one surface of the tape and another strip of adhesive extends along the other surface thereof adjacent one edge thereof. Welting is adhered along the one surface of the tape, which wraps therearound and is adhered thereto with a flange extending free therefrom that underlying adheres to the unfinished edge of the carpet.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 3 is a diagrammatic perspective view of the first embodiment of the present invention, per se;

FIG. 5 is a diagrammatic perspective view of the second embodiment of the present invention, per se;

FIG. 7 is a diagrammatic perspective view of the third embodiment of the present invention, per se.

Figure 1:
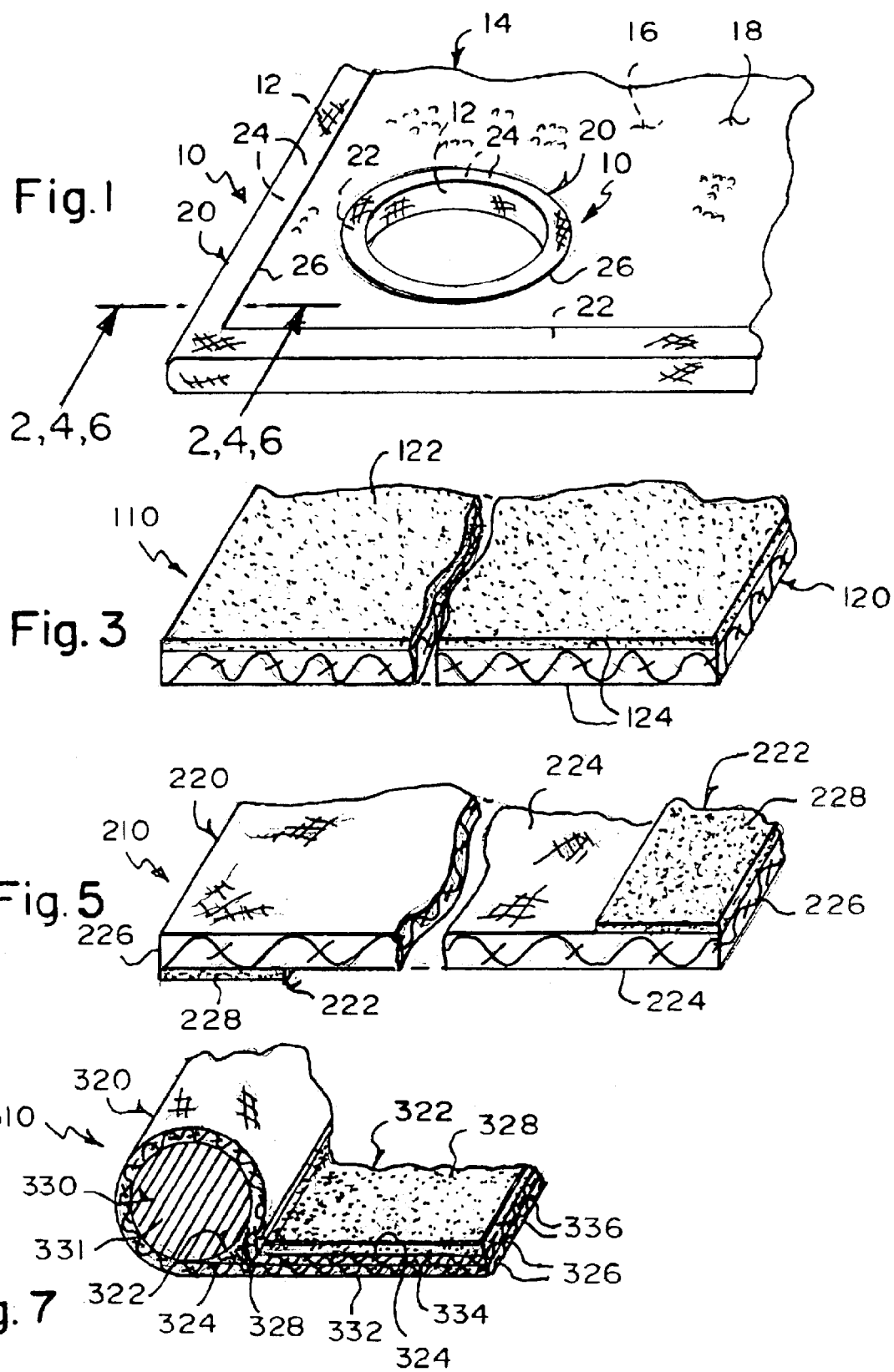
FIG. 1 is a diagrammatic perspective view of the present invention in use.

LIST OF REFERENCE NUMERALS UTILIZED IN THE DRAWING 10 binding of present invention for protecting unfinished edge 12 of carpet 14.
12 unfinished edge 12 of carpet 14
14 carpet
16 floor-abutting surface of unfinished edge 12 of carpet 14
18 ambient-facing surface of unfinished edge 12 of carpet 14
20 tape
22 adhesive for adhering tape 20 to unfinished edge 12 of carpet 14
24 pair of opposing surfaces of tape 20
26 pair of opposing edges defining pair of opposing surfaces of tape

First Embodiment 110 binding
120 tape for capturing unfinished edge 12 of carpet 14 (FIGS. 2 & 3)
122 adhesive
124 pair of opposing surfaces of tape 120

Second Embodiment 210 binding
220 tape for capturing unfinished edge 12 of carpet 14, (FIGS. 4 & 5)
222 adhesive
224 pair of opposing surfaces of tape 220
226 pair of opposing edges of tape 220
228 pair of adhesive strips of adhesive 222

Third Embodiment 310 binding
320 tape (FIGS. 6 & 7)
322 adhesive
324 pair of opposing surfaces of tape 320
326 pair of opposing edges of tape 320
328 pair of adhesive strips of adhesive 322
330 welting
331 paper rope of welting 330
332 originating portion of tape 320
334 terminating portion of tape 320
336 flange of tape 320

DETAILED DESCRIPTION OF THE PREFERRED EMBODIMENT

Referring now to the figures, in which like numerals indicate like parts, and particularly to FIG. 1, the binding of the present invention is shown generally at 10 for protecting an unfinished edge 12 of a carpet 14. The unfinished edge 12 of the carpet 14 has a floor-abutting surface 16 and an ambient-facing surface 18. The ambient-facing surface 18 of the unfinished edge 12 of the carpet 14 opposes the floor-abutting surface 16 of the unfinished edge 12 of the carpet 14.

The binding 10 comprises a tape 20 and an adhesive 22. The tape 20 has a pair of opposing surfaces 24 defined by a pair of opposing edges 26. The adhesive 22 is disposed on the tape 20, and is for adhering the tape 20 to the unfinished edge 12 of the carpet 14.

Figure 2:
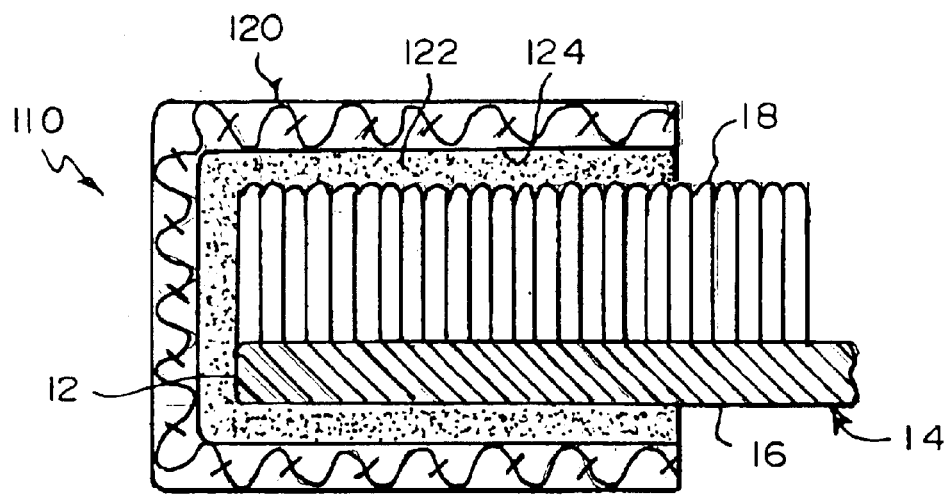
FIG. 2 is an enlarged diagrammatic cross sectional view taken along LINE 2—2 in FIG. 1 of a first embodiment of the present invention in use.

The configuration of a first embodiment of the binding 110 can best be seen in FIGS. 2 and 3, and as such, will be discussed with reference thereto.

The adhesive 122 completely covers one surface of the pair of opposing surfaces 124 of the tape 120. The tape 120 is bent into a channel shape for capturing the unfinished edge 12 of the carpet 14 by having the one surface of the pair of opposing surfaces 124 of the tape 120 originate against the floor-abutting surface 16 of the unfinished edge 12 of the carpet 14, bend up over the unfinished edge 12 of the carpet 14, and terminate against the ambient-facing surface 18 of the unfinished edge 12 of the carpet 14 so as to allow the adhesive 122 to abut the unfinished edge 12 of the carpet 14 completely and adhere the tape 120 to the unfinished edge 12 of the carpet 14 when the tape 120 is heated by a special iron design precisely for this purpose, which melts the adhesive 122, and which is the subject matter of another application.

Figure 4:
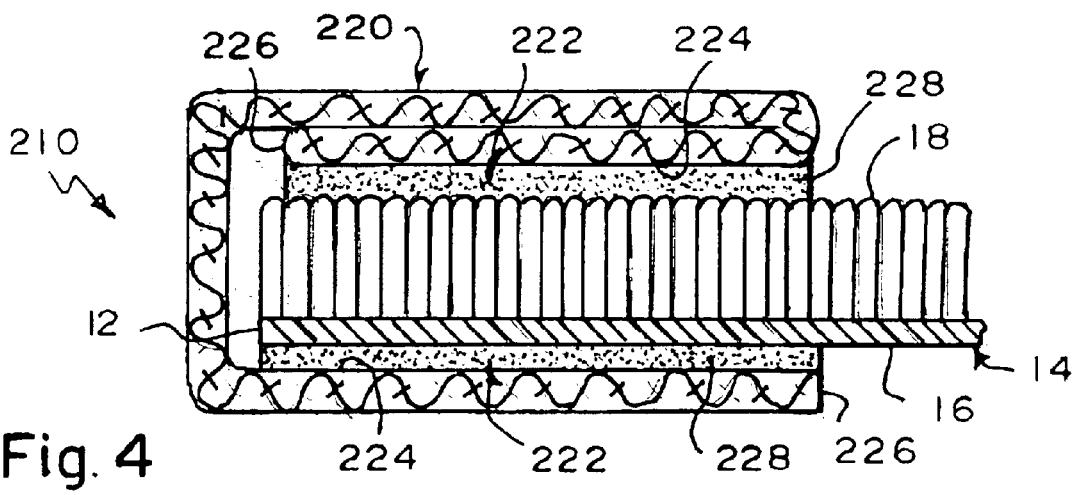
FIG. 4 is an enlarged diagrammatic cross sectional view taken along LINE 4—4 in FIG. 1 of a second embodiment of the present invention in use.

The configuration of a second embodiment of the binding 210 can best be seen in FIGS. 4 and 5, and as such, will be discussed with reference thereto.

The adhesive 222 is a pair of adhesive strips 228. One strip of the pair of adhesive strips 228 of the adhesive 222 extends along one surface of the pair of opposing surfaces 224 of the tape 220, adjacent one edge of the pair of opposing edges 226 of the tape 220. The other strip of the pair of adhesive strips 228 of the adhesive 222 extends along the other surface of the pair of opposing surfaces 224 of the tape 220, adjacent the other edge of the pair of opposing edges 226 of the tape 220.

The tape 220 is bent into a channel shape for capturing the unfinished edge 12 of the carpet 14 by having the one surface of the pair of opposing surfaces 224 of the tape 220 originate against the floor-abutting surface 16 of the unfinished edge 12 of the carpet 14, bend up over the unfinished edge 12 of the carpet 14, bend back under itself so as to allow the other surface of the pair of opposing surfaces 224 of the tape 220 to terminate against the ambient-facing surface 18 of the unfinished edge 12 of the carpet 14 so as to allow the one strip of the pair of adhesive strips 228 of the adhesive 222 to abut the floor-abutting surface 16 of the unfinished edge 12 of the carpet 14 and the other strip of the pair of adhesive strips 228 of the adhesive 222 to abut the ambient-facing surface 18 of the unfinished edge 12 of the carpet 14 and adhere the tape 220 to the unfinished edge 12 of the carpet 14 when the tape 220 is heated by the iron tool.

Figure 6:
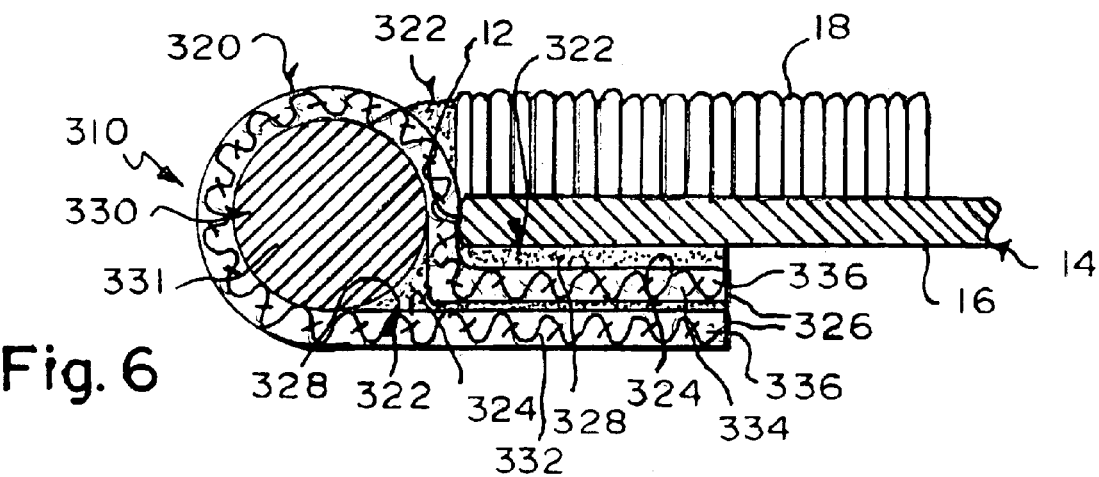
FIG. 6 is an enlarged diagrammatic cross sectional view taken along LINE 6—6 in FIG. 1 of a third embodiment of the present invention in use.

The configuration of a third embodiment of the binding 310 can best be seen in FIGS. 6 and 7, and as such, will be discussed with reference thereto.

The adhesive 322 is a pair of adhesive strips 328. One strip of the pair of adhesive strips 328 of the adhesive 322 completely covers one surface of the pair of opposing surfaces 324 of the tape 320.

The other strip of the pair of adhesive strips 328 of the adhesive 322 extends along the other surface of the pair of opposing surfaces 324 of the tape 320, adjacent one edge of the pair of opposing edges 326 of the tape 320.

The binding 310 further comprises welting 330. The welting 330 is a paper rope 331.

The welting 330 extends along the one surface of the pair of opposing surfaces 324 of the tape 320, substantially midway between the pair of opposing edges 326 of the tape 320, and is adhered thereto by the one strip of the pair of adhesive strips 328 of the adhesive 322 on the one surface of the pair of opposing surfaces 324 of the tape 320.

The tape 320 wraps around, and adheres to, the welting 330, with an originating portion 332 of the tape 320 and a terminating portion 334 of the tape 320 extending free of the welting 330.

The terminating portion 334 of the tape 320 overlies the originating portion 332 of the tape 320, and is adhered thereto by virtue of the one strip of the pair of adhesive strips 328 of the adhesive 322 on the one surface of the pair of opposing surfaces 324 of the tape 320 so as to form a flange 336.

The flange 336 of the tape 320 has the other strip of the pair of adhesive strips 328 of the adhesive 322 thereon by virtue of the terminating portion 334 of the tape 320 having the other surface of the pair of opposing surfaces 324 of the tape 320 exposed thereon. Flange 336 is impregnated with an edge sealing adhesive, typically FAST LOCK (R) manufacture by Orcon Corp. 1570 Atlantic street, Union city, ca 94587-3299. This makes the surface of tape 320 less porous so that adhesive does not penetrate through the material when it is applied to the carpet edge. It is further understood as a practical matter that the tape 320 may be manufactured with or without adhesive 328.

The unfinished edge 12 of the floor-facing surface 16 of the carpet 14 overlyingly abuts the flange 336 of the tape 320 and is adhered thereto by the other strip of the pair of adhesive strips 328 of the adhesive 322 when the tape 320 is heated by the iron tool.

It will be understood that each of the elements described above, or two or more together, may also find a useful application in other types of constructions differing from the types described above.

While the invention has been illustrated and described as embodied in a thermoglue binding tape to protect and decorate carpet's edges and borders with a fuse system, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A thermoglue binding tape to protect and decorate carpet's edges and borders with a fuse system, wherein the unfinished edge of the carpet has a floor-abutting surface and an ambient-facing surface, and wherein the ambient-facing surface of the unfinished edge of the carpet opposes the floor-abutting surface of the unfinished edge of the carpet, said binding comprising:

a) a tape;

b) an adhesive; and c) welting;

wherein said tape has a pair of opposing surfaces;

wherein said pair of opposing surfaces of said tape is defined by a pair of opposing edges;

wherein said adhesive is disposed on said tape;

wherein said adhesive is for adhering said tape to the unfinished edge of the carpets;

wherein said adhesive is a pair of adhesive strips;

wherein one strip of said pair of adhesive strips of said adhesive completely covers one surface of said pair of opposing surfaces of said tape;

wherein the other strip of said pair of adhesive strips of said adhesive extends along the other surface of said pair of opposing surfaces of said tape;

wherein the other strip of said pair of adhesive strips of said adhesive is adjacent one edge of said pair of opposing edge of said tapes;

wherein said welting extends along said one surface of said pair of opposing surfaces of said tape;

wherein said welting is disposed substantially midway between said pair of opposing edges of said tape;

wherein said welting is adhered to said tape by said one strip of said pair of adhesive strips of said adhesive on said one surface of said pair of opposing surfaces of said tape;

wherein said tape wraps around said welting;

wherein said tape adheres to said welting;

wherein said tape has an originating portion;
wherein said originating portion of said tape extends free of said welting;
wherein said tape has a terminating portion;
wherein said terminating portion of said tape extends free of said welting;
wherein said terminating portion of said tape overlies said originating portion of said tape and is adhered thereto, by virtue of said one strip of said pair of adhesive strips of said adhesive on said one surface of said pair of opposing surfaces of said tape, so as to form a flange.

2. The binding as defined in claim 1, wherein said welting is a paper rope.

3. The binding as defined in claim 1, wherein said flange of said tape has the other strip of said pair of adhesive strips of said adhesive thereon by virtue of said terminating portion of said tape having other surface of said pair of opposing surfaces of tape exposed thereon.

4. The binding as defined in claim 3, wherein said flange of said tape is for underlying abutting the floor-facing surface of the unfinished edge of the carpet and is adhered thereto by said other strip of said pair of adhesive strips of said adhesive when said tape is heated by a special iron design precisely for this purpose, which melts said adhesive.

* * * * *